(12) United States Patent
Relyea et al.

(10) Patent No.: US 6,185,285 B1
(45) Date of Patent: Feb. 6, 2001

(54) METHOD FOR PROVIDING NETWORK USERS WITH IMPROVED MANAGEMENT OF A COMMUNICATIONS SERVICE FEATURE

(75) Inventors: Wayne E. Relyea, Middletown; Edward Nicholas Shipley, Holmdel, both of NJ (US)

(73) Assignee: AT&T Corp., New York, NY (US)

( * ) Notice: Under 35 U.S.C. 154(b), the term of this patent shall be extended for 0 days.

(21) Appl. No.: 08/949,665

(22) Filed: Oct. 14, 1997

(51) Int. Cl.[7] .............................. H04M 3/42; H04M 3/56; H04M 11/00
(52) U.S. Cl. ...................... 379/207; 379/93.21; 379/204; 379/900
(58) Field of Search ...................................... 379/201, 202, 379/219, 220, 115, 93.21, 207, 203, 204, 205, 206, 900

(56) References Cited

U.S. PATENT DOCUMENTS

| 4,277,649 | 7/1981 | Sheinbein | 379/201 |
|---|---|---|---|
| 4,653,090 | * 3/1987 | Hayden | 379/204 |
| 4,953,159 | 8/1990 | Hayden et al. | 370/265 |
| 5,469,500 | * 11/1995 | Sattar et al. | 379/201 |
| 5,511,116 | * 4/1996 | Shastry et al. | 379/201 |
| 5,533,110 | 7/1996 | Pinard et al. | 379/201 |
| 5,572,581 | * 11/1996 | Sattar et al. | 379/201 |
| 5,581,560 | 12/1996 | Shimada et al. | 370/527 |
| 5,644,631 | * 7/1997 | Sattar et al. | 379/201 |
| 5,912,954 | * 6/1999 | Whited et al. | 379/115 |
| 5,915,008 | * 6/1999 | Dulman | 379/201 |

* cited by examiner

Primary Examiner—Harry S. Hong
(74) Attorney, Agent, or Firm—Kenyon & Kenyon (57) ABSTRACT

A method using an Internet or similar connection to provide network users with information about and control over a communications service feature. A communications switch routes communications in the network to and from the user and a feature control process provides the communications service feature to the user. A processor in communication with the feature control process and a user terminal provides the user with information about and control over the communications service feature at the user terminal. The process can be a dedicated Internet server and the user can manage the communications service feature from a home page displayed on the user terminal.

28 Claims, 7 Drawing Sheets

**CALL MANAGEMENT SYSTEM
FEATURE ACTIVATION REQUEST**

341 — STATION ID: _________

342 — CUSTOMER ID: _________

ACTIVE CALL CONTROLS:

361 — PLACE CALL ON HOLD: _________

362 — TRANSFER CALL TO: _________

363 — FORWARD BUSY TO: _________

364 — FORWARD NO ANSWER TO: _________

365 — CONFERENCE WITH: _________

**STATIC FEATURE CONTROLS
ACTIVATE/DEACTIVATE:**

366 — CALL RESTRICTIONS: _________

367 — CALL WAITING: _________

368 — CALLER ID BLOCKING: _________

DEFINE FEATURE LIST:

369 — BLOCK CALL FROM: _________

370 — BLOCK CALLS TO: _________

371 — PRIORITY CALLS: _________

. . .

372 — OTHER FEATURES: _________

*FIG. 4*

**CALL MANAGEMENT SYSTEM
CONFERENCE CONTROLS**

400

410 — STATION ID: _________

401 — ACTIVE STATIONS: _________ _________ _________

402 — MUTE STATION: _________

403 — PRIVATE CONVERSATION WITH STATION: _________

404 — DROP STATION: _________

405 — ADD STATION: _________

.
.
.

406 — OTHER DATA: _________

METHOD FOR PROVIDING NETWORK USERS WITH IMPROVED MANAGEMENT OF A COMMUNICATIONS SERVICE FEATURE

FIELD OF THE INVENTION

The invention relates to providing network users with improved management of a communications service feature. More particularly, the invention relates to a method using an Internet or similar connection to provide network users with information about and control over a communications service feature.

BACKGROUND OF THE INVENTION

Communications network providers such as AT&T typically offer an array of communications service features. An example of such a communications service feature is call forwarding, which automatically routes an incoming telephone call to another station. Other examples of communications service features that can be offered are three way teleconferencing, call waiting, call transfer, access control, private numbering plans and customized billing options.

Currently, network users have only a limited ability to manage these communications service features. For example, in the public switched telephone network a user may use flash-hooks and Dual-Tone Multi-Frequency (DTMF) digits to initiate features such as conferencing or call transfer. Integrated Services Digital Network (ISDN) telephone sets can access similar functionality via pre-programmed feature buttons followed by the entry of DTMF digits. The management of the communications service feature is normally supplied by an intelligent key or private branch exchange (PBX) system on the user's premises. Management can also be supplied by a local exchange network's service such as Centrex.

A common characteristic of existing call control capabilities is the limited interface through which a user can manage communications service features. This limited interface often makes access to information about and control over a communications service feature difficult for a user. For example, users with ISDN telephones can typically only access a limited set of communications service features from their station set, such as three station conferencing and transfer to another station. The features that are provided are constrained by difficulty of defining a simple user interface.

In view of the foregoing, it can be appreciated that a substantial need exists for a method to provide network users with a simple interface to obtain information about and exercise control over a communications service feature.

SUMMARY OF THE INVENTION

The disadvantages of the art are alleviated to a great extent by a method using an Internet or similar connection to provide network users with information about and control over a communications service feature. This management connection between the network user's terminal or personal computer and the communications switch provides the network user with an improved way to manage a communications service feature.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention is directed to a method using an Internet or similar connection to provide network users with information about and control over a communications service feature. Referring now in detail to the drawings wherein like parts are designated by like reference numerals throughout, there is illustrated in FIG. 1 a block diagram including elements of a switched telephone network, a communications network suitable for practicing an embodiment of the present invention.

Figure 1:
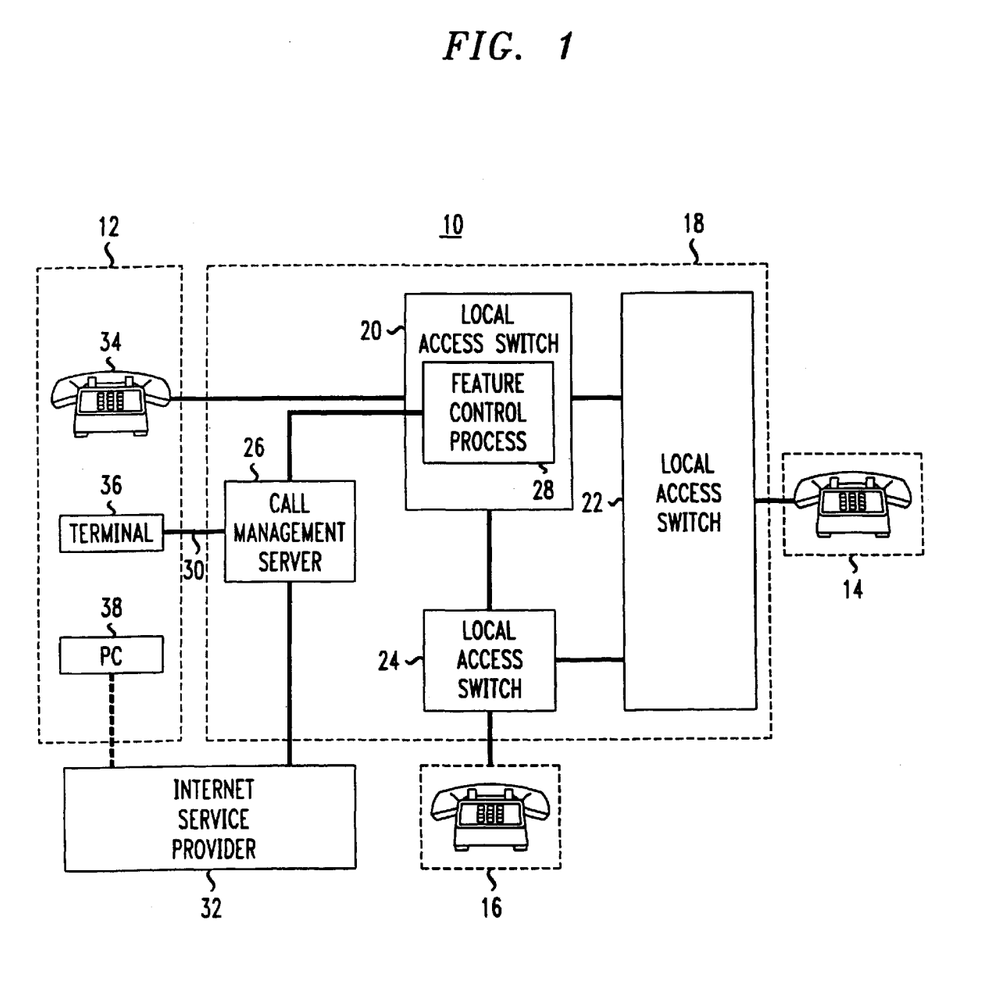
FIG. 1 is a block diagram of a system suitable for practicing an embodiment of the present invention.

The communications network 10 shown in FIG. 1 contains a local access provider network 18 in communication with three different subscriber locations 12, 14, 16. Local access provider network 18 includes three local access switches 20, 22, 24 and a call management server 26. The call management server 26 communicates with a user's terminal 36 or Personal Computer (PC) 38 and the feature control process 28 of a local access switch 20. Access to the call management server 26 can be provided with either a direct dial-up interface 30 or through an Internet service provider 32.

The general principles of the invention will be illustrated by describing the process by which a user at one subscriber location 12 can implement and control a three-way conference with users at the other two subscriber locations 14, 16. A call placed from telephone station 34 at subscriber location 12 is routed to subscriber location 14 through local access switches 20 and 22. The user at subscriber location 12 then implements a teleconference arrangement on local access switch 20 by communicating with the call management server 26 using either direct dial-up access 30 or Internet access from the user's terminal 36 or PC 38.

The call management server 26 can provide the user with a menu of features that can be activated during the call, such as three-way call conferencing. This menu can be associated with the caller's station ID or with a personal ID associated with the user. When the user requests three-way conferencing to subscriber location 16, the call management server 26 instructs the feature control process 28 to initiate a call to subscriber location 16. The call will be routed from local access switch 20 to subscriber location 16 through local access switch 24. When the call is answered, the feature control process 28 notifies the call management server 26 that the three-way conference has been successfully completed. At this point, a conference administration screen can be displayed to the user on either terminal 36 or PC 38.

During a call, the user at subscriber location 12 can manage aspects of the teleconference such as muting one of the participants, or having a private conversation with one of the participants. These features can be implemented through the user's terminal 36 or PC 38. Upon receipt of the user's request, call management server 26 instructs local access switch 20, via the switch's control process 28, to implement the requested actions on the associated conference bridge. The feature control process 28 notifies the user that the operation is complete through the call management server 26.

The local access provider can also utilize an active call management session to notify the user of incoming calls, and let the user take action on these calls. For example, the local access provider could alert the user at subscriber location 12 that a call is incoming. The user at subscriber location 12 could then put an existing call on hold to answer the incoming call, transfer the incoming call to another station or bridge the call into the existing connection. All of these controls would be through the user's terminal 36 or PC 38, the call management server 26 and the feature control process 28.

Figure 2:
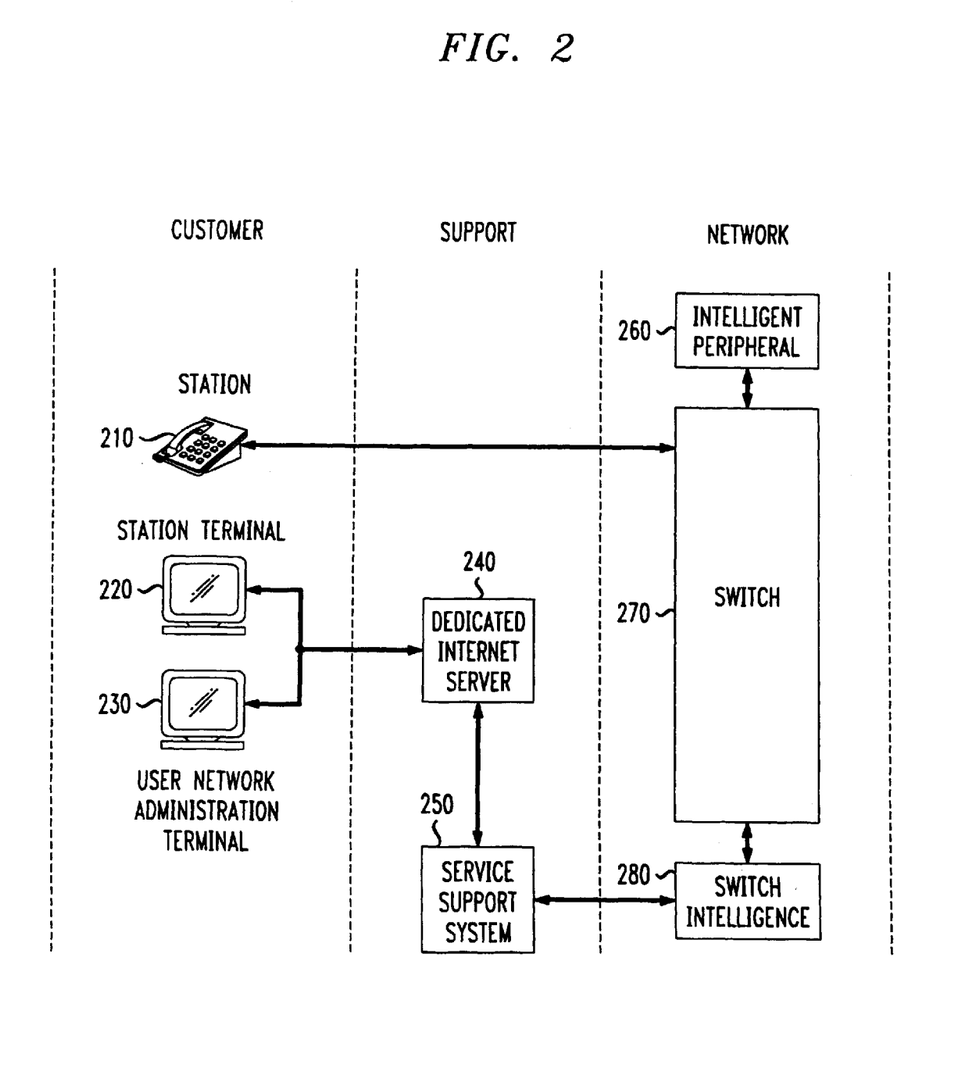
FIG. 2 is a block diagram of a first embodiment of the present invention.

FIG. 2 shows a preferred embodiment of the system described above. As shown in FIG. 2, a station 210, such as a telephone, can communicate with the network through a switch 270. The switch 270 can be a No. 4 Electronic Switching System (4ESS) switch available from Lucent Technologies, Inc. The switch 270 can communicate with an adjunct service point that responds to requests for service processing, shown as intelligent peripheral 260. The switch 270 can also communicate with a facility that provides database and call processing procedures for special calls, such as a Service Control Point (SCP), shown as switch intelligence 280. The switch intelligence 280 performs the function of the feature control process 28 shown in FIG. 1.

A Dedicated Internet Server (DIS) 240 is depicted which communicates with a station terminal 220 associated with the station telephone 210, a user network administration terminal 230 and a service support system 250, such as the SMS that normally controls a SCP. The DIS 240 performs the function of the call management server 26 shown in FIG. 1. The name "dedicated Internet server" indicates that Internet style communications can be used to provide the capabilities described in detail below, but there are numerous other ways that these capabilities can be arranged. Any processor, for example, that communicates with the switch 270, service support system 250 and station terminal 220 could be used in place of the DIS 240. However, because a user may also wish to use a station terminal 220 for normal Internet access, the use of Internet technology may be especially convenient and straightforward.

Although each customer network can have its own dedicated DIS 240, the servers of many customer networks can share a single computer system which may also support other functions. The network provider can administer the details of a customer's communications service feature subscriptions in the DIS 240 assigned to the customer network. This could be in the form of a customer network database containing information about the network numbering plan, the number ranges assigned to the network, and the communications service features to which the customer subscribes.

The user network administration terminal 230 lets a customer access the customer network database. A customer can, for example, assign a specific telephone number to a physical location, associate names and features with each number, and enter change orders. This gives the customer limited control over the details of the customer's network and is similar to the arrangement used for Centrex service, with the exception that the DIS 240 encompasses the entire customer network.

The DIS 240 communicates through the service support system 250 with the switch intelligence 280, which in turn communicates with the switch 270 as described above. In this way, the DIS 240 distributes the necessary provisioning information through the appropriate service support systems 250 to the appropriate network elements. Although FIG. 2 shows a single service support system 250 feeding a single switch intelligence unit 280, it is possible to distribute these capabilities. This may be especially desirable in a large customer network.

Each of the switches 270 that support customer locations sends call detail record data to the DIS 240. These records let the DIS 240 provide a complete set of network management reports to the customer's Network Administrator. The call detail record data may be augmented or supplanted by information available from the switch intelligence 280 or other sources. In addition, the DIS 240 can generate a "home page" for each station 210 including a log of all traffic originating and terminating at that station 210. Each call can be identified by the calling or called party number and any special features used on the call. The home page can be enhanced with information from the DIS 240 data base, such as the identify of the calling or called party, and information about the status of communications service features, such as call forwarding.

In the arrangement shown in FIG. 2, call forwarding entries can be made and canceled at the station terminal 220 or at the user network administration terminal 230. The call forwarding command is stored in the DIS 240 and passed through the service support system 250 to the switch intelligence 80 for implementation. Changes to call forwarding entered remotely (through a station other than the user's station 210) will be recorded in switch intelligence and passed through the service support system 250 to the DIS 240 for recording and display on the stations's home page.

Information sent from the switch 270 to the DIS 240 includes information about call initiation as well as information about call termination. The DIS 240, consequently, contains a database of active calls for each station and it can interact directly with the switch intelligence 280 to manage existing calls, or to establish new calls, based on input from station terminal 220. For example, if a station 210 has multiple calls on hold, each of the calls can be shown on the home page together with the number of the calling/called station. The user can easily manage which call they would like to connect with next through the station terminal 220. The call can be selected, for example, by "double clicking" the desired call entry.

Figure 5A:
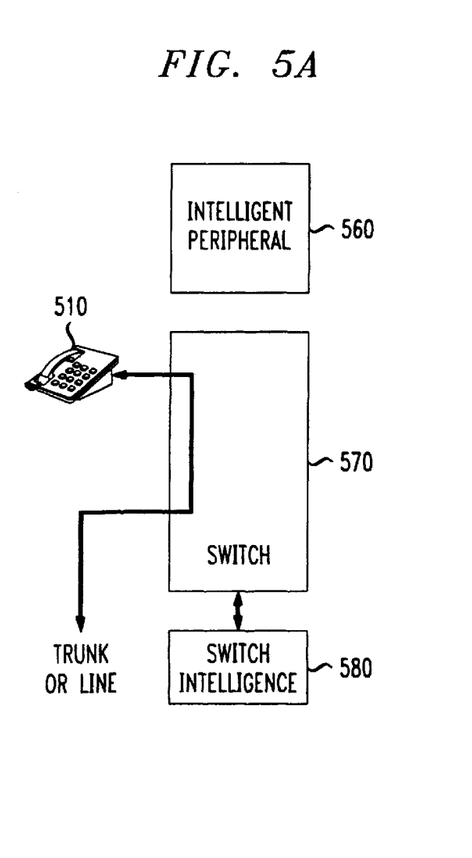
FIGS. 5A and 5B are block diagrams showing how a communication is routed through an intelligent peripheral when initiating a dynamic network-based teleconference during an existing telephone call.
Figure 5B:
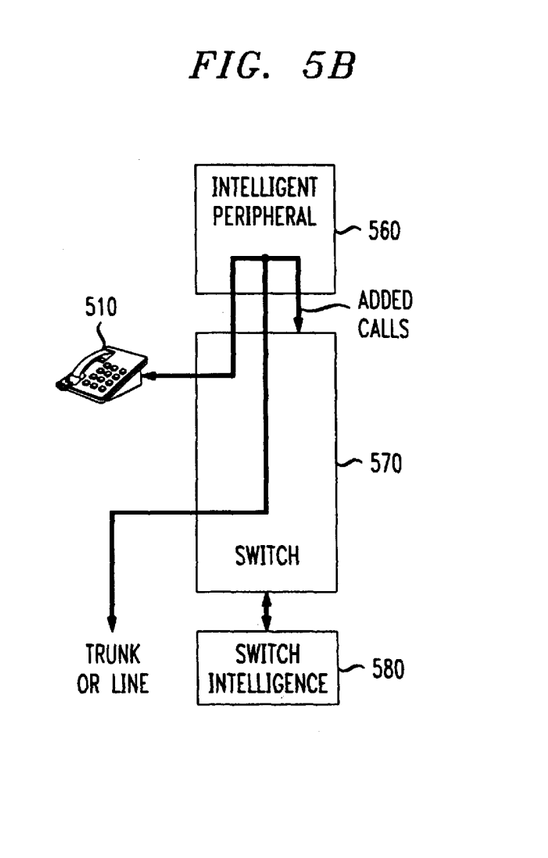

This access through the station terminal 220 can be used to provide dynamic network based teleconferencing. The initiation of the activity using an existing telephone call is shown in FIGS. 5A and 5B. Upon receiving a command from a station terminal, the DIS (not shown in FIGS. 5A and 5B) accesses a database to identify the call that is to be included in the teleconference bridge, shown in FIGS. 5A and 5B as the intelligent peripheral 560. The identification can be in terms recognized by the switch 570 and the appropriate information will have been in the call detail record received at the initiation of the call. The DIS sends a command through the service support system (not shown in FIGS. 5A and 5B) to the switch intelligence 580. New functionality in the switch intelligence 580 and the switch 570 can allow the switch intelligence 580 to command the switch 570 to reconnect the existing call to an available intelligent peripheral 560, such as a conference bridge. The station terminal can also command that additional lines to specific station numbers be connected to the teleconference bridge, allowing an entire teleconference be managed through a station terminal.

Referring again to FIG. 2, the switch intelligence 280 can communicate with the intelligent peripheral 260 through standard Intelligent Peripheral signaling protocols, although new commands may be defined. This lets the switch intelligence 280 control the status of each connection to the intelligent peripheral 260, and, for example, order that calls be disconnected. The status of all the calls on the teleconference can be displayed on the home page, including a specific identification of each connection. The host is able to command the disconnection of a specific line, put a specific line or lines on mute or allow the lines to have "listen only" status. The status can be changed dynamically during the course of a teleconference under control of the station terminal 220.

Figure 3:
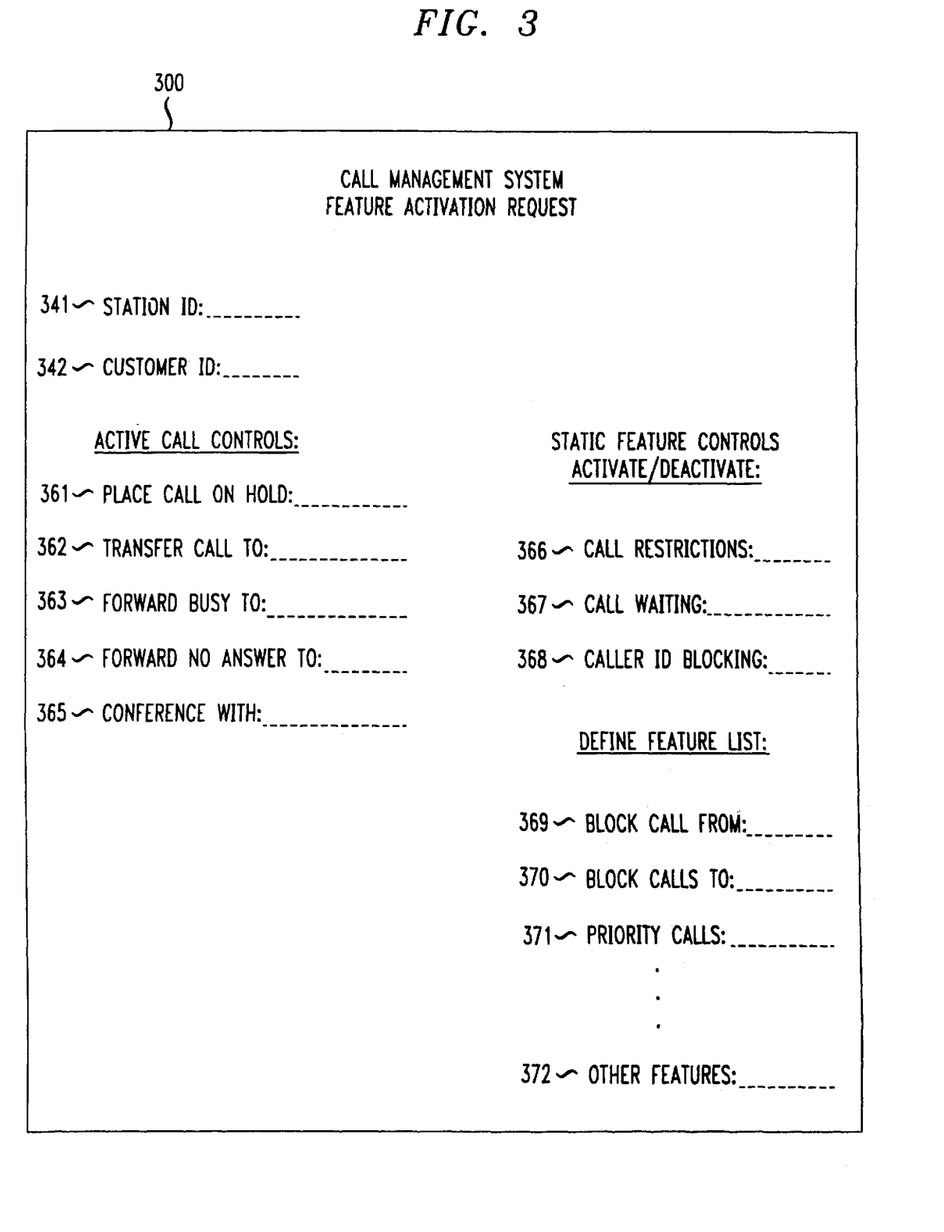
FIGS. 3 and 4 are examples of computer screen displays that could be used to practice the present invention.
Figure 4:
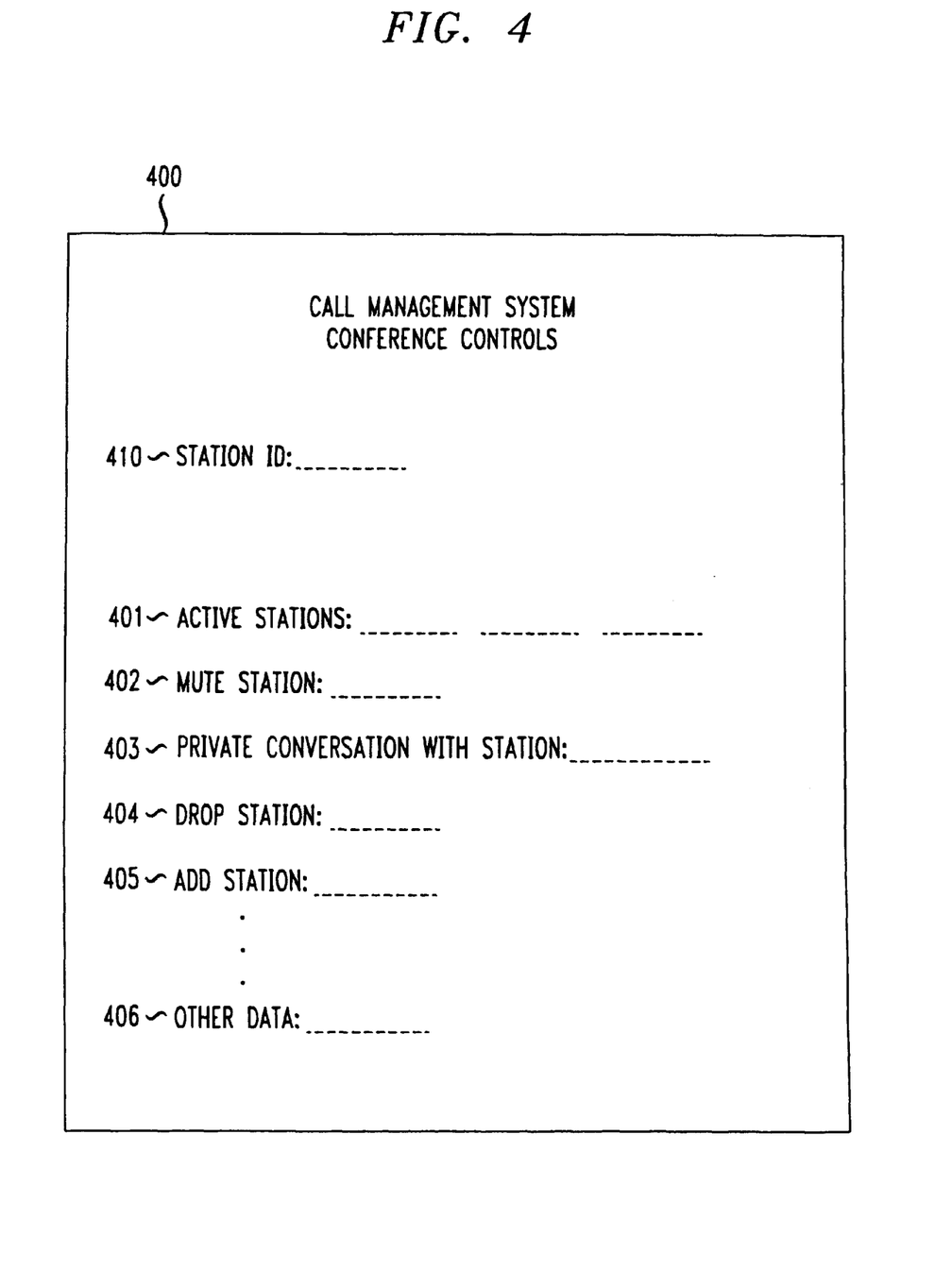

FIGS. 3 and 4 show two call management interface screens 300, 400. Feature activation request screen 300 includes key data fields 341, 342 which uniquely identify the user's location. The feature activation request screen 300 also includes call attribute data 361 through 372 associated with a number of different attributes or features available to the user. In the context of local calling features, these attributes may include active call controls such as call hold 361, call transfer 362, call forward/busy 363, call forward/no answer 364 and conferencing 365. The definition or activation of static features can also be displayed, such as, for example: call restrictions 366, call waiting 367, caller ID blocking 368, block calls from 369, block calls to 370, priority calls 371 or other communications service features 372 that may be applicable.

Conference controls screen 400 illustrates an active call management interface to the call management server 26, including key data field 410 which uniquely identifies the user's location and a list of other active stations 401. Active call management features associated with the call are also displayed, such as, for example: station muting 402, private conversations 403, drop station 404, add station 405, or other features 406 that could be applicable to the conference bridge.

Figure 6:
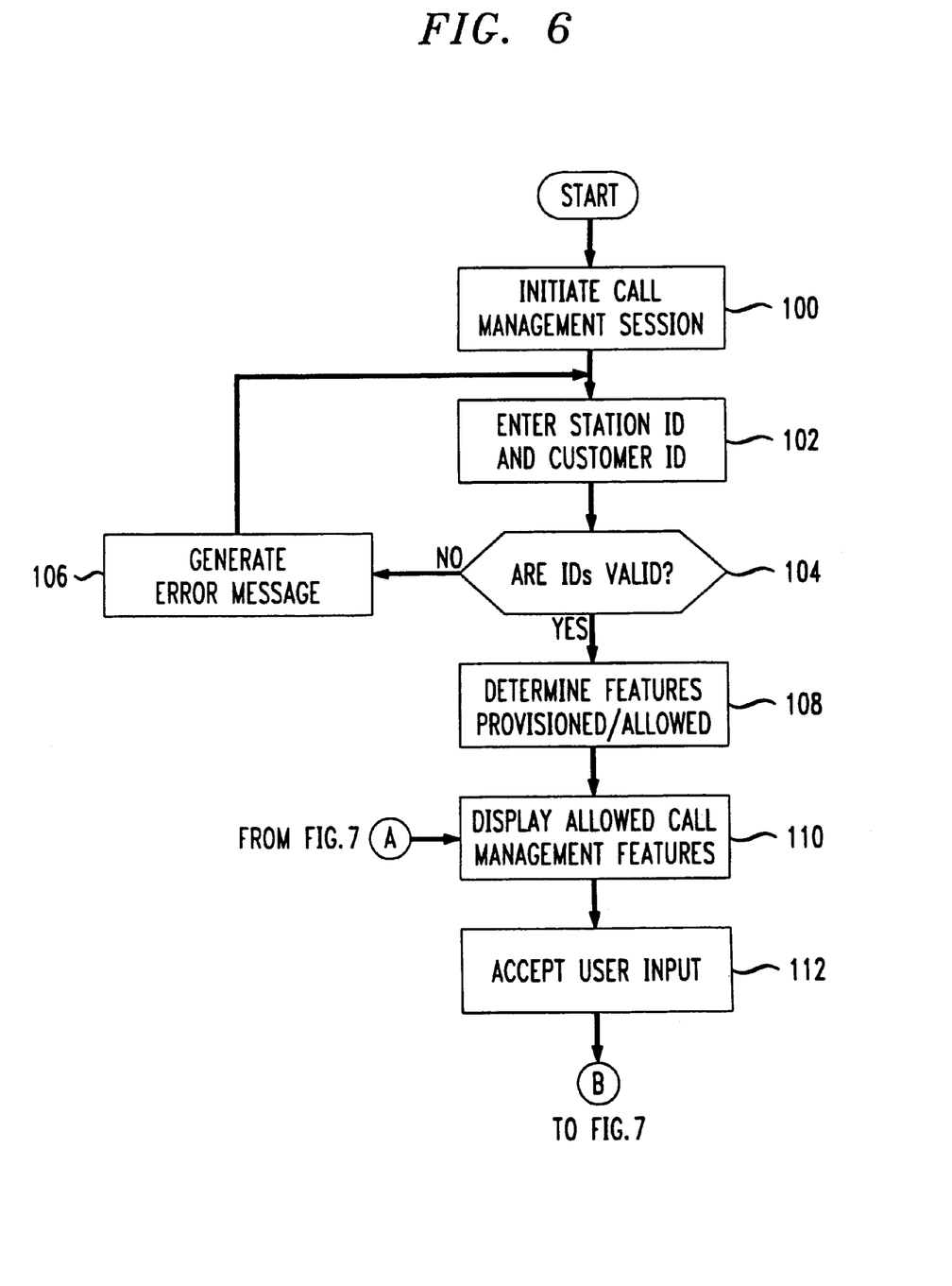
FIGS. 6 through 8 are block flow diagrams of steps performed in accordance with an embodiment of the invention.
Figure 7:
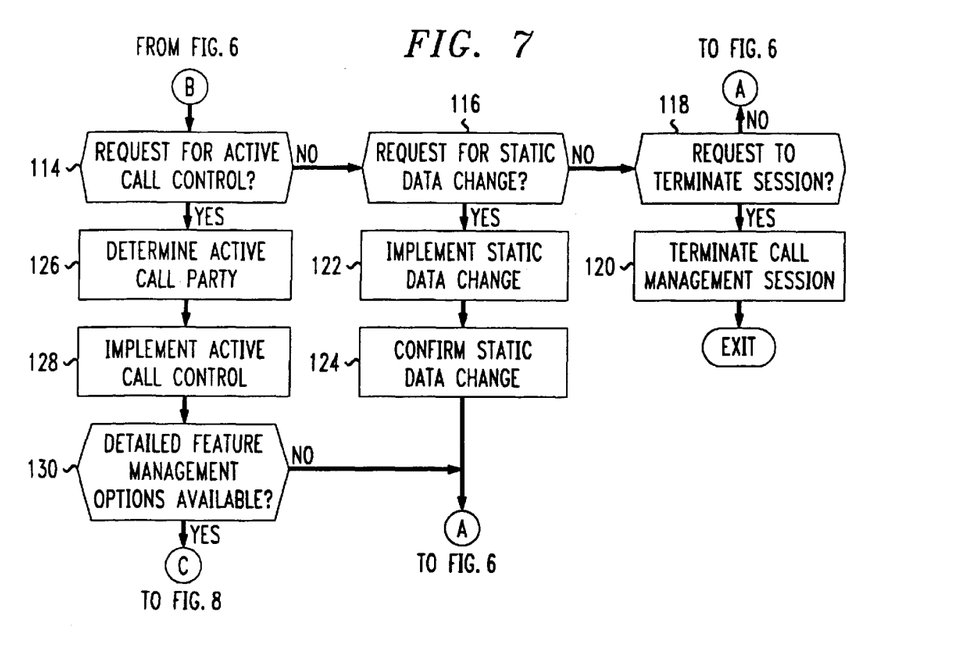
Figure 8:
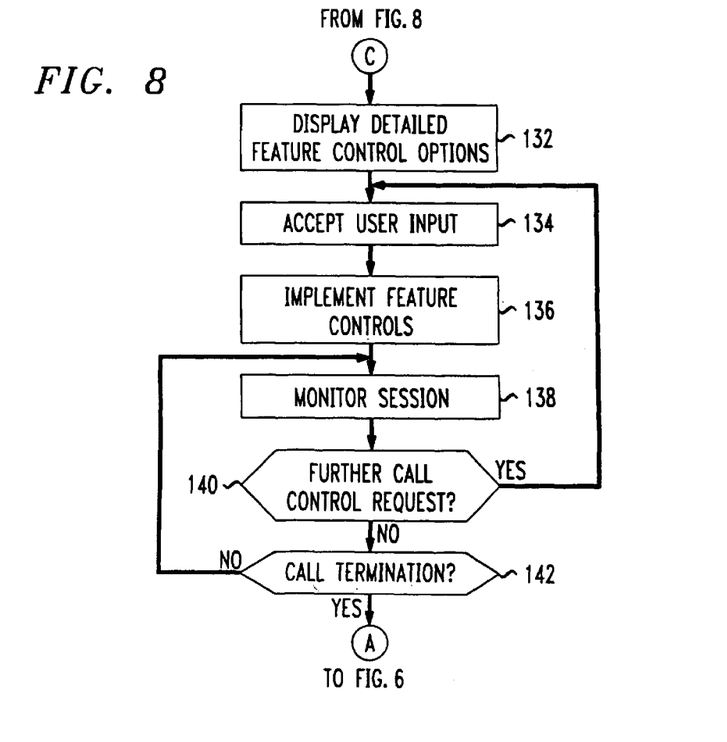

Refer now to FIGS. 6 through 8 which show block flow diagrams of steps performed in accordance with an embodiment of the invention. Initially, at step 100 in FIG. 6, a call management session is initiated for the user. After the station ID and customer ID are validated at steps 102, 104 and 106, the allowed call management features are determined and displayed to the user at steps 108 and 110. The user input received at step 112 determines if an active call control, a static data change or session termination has been requested by the user at steps 114, 116 and 118 as shown in FIG. 7. If session termination was requested, the call management session is terminated at step 120. If a static data change was requested, the static data change is implemented and confirmed at steps 122 and 124 and the allowed call management features are displayed again.

If an active call control has been requested, the active call party is determined and the active call control is implemented at steps 126 and 128. If detailed feature management options are not available at step 130, the allowed call management features are again displayed. If detailed feature management options are available at step 130, the detailed feature control options are displayed to the user at step 132, as shown in FIG. 8. User input is then accepted and feature controls are implemented at steps 134 and 136. The session is monitored at step 138 to see if further call control requests are made. At step 140, further call control requests are accepted and implemented. Finally, the call is terminated at step 142 when requested by the user.

Although various embodiments are specifically illustrated and described herein, it will be appreciated that modifications and variations of the present invention are covered by the above teachings and within the purview of the appended claims without departing from the spirit and intended scope of the invention. For example, although a dedicated Internet processor is shown and described, it can be appreciated that any processor in communication with the user and the feature control process of a communications switch can be utilized instead and still fall within the scope of the invention.

What is claimed is:

1. A method for providing call management control to a participant of a conference call, comprising:

establishing a multiparty call that includes the participant, during the multiparty call, providing a call handling option to the participant through a call management processor, the call management processor connected to a local access switch, the participant remotely connected to each of the call management processor and to the local access switch;

receiving an identification of a selected option, and implementing the selected option.

2. The method of claim 1, wherein said multiparty call is a three-way call conferencing.

3. The method of claim 1, wherein said call handling is associated with a caller's station identification.

4. The method of claim 1, wherein said call handling options is provided in the form of a administration screen displayed at said user terminal.

5. The method of claim 4, wherein said user terminal is a personal computer.

6. The method of claim 1, wherein said handling option includes a feature of muting one or more of the participants.

7. The method of claim 1, wherein said handling option includes a feature of providing a private conversation with one or more of the multiparty participants.

8. A method to provide a network user with information associated with and control over a communications service feature with respect to an in-progress communication in the network, comprising the steps of:

sending in-progress communication information associated with the in-progress communication from a communications switch routing the in-progress communication to a call management processor, each of the communications switch and the call management processor remotely connected to the network user;

sending service feature information associated with the communications service feature from a feature control unit to the call management processor;

providing management information from the call management processor to the network user based on the in-progress communication information and the service feature information;

providing control information from the user to the feature control unit through the call management processor; and controlling the communications service feature with the feature control unit based on said control information.

9. The method of claim 8 wherein the network is a switched telephone network.

10. The method of claim 9, wherein the feature control unit is a switch intelligence unit.

11. The method of claim 9 wherein the call management processor is a dedicated Internet server and the user communicates with the dedicated Internet server with a user terminal connected to the dedicated Internet server through the Internet.

12. The method of claim 11 wherein the information associated with and control over the communications service feature is provided on a home page displayed on the user terminal.

13. The method of claim 9 wherein the in-progress communication information includes call detail record data.

14. The method of claim 10 wherein said step of sending in-progress communication information to the call management processor includes information from the switch intelligence unit.

15. The method of claim 9 wherein the user communicates with the call management processor through a user terminal connected to the call management processor by direct dial-up access.

16. The method of claim 14 wherein the switch intelligence unit is a service control point.

17. A method to provide a network user with management of a communications service feature, comprising the steps of:

controlling the communications service feature with a feature control process in communication with a communications switch that routes communications in the network;

sending information associated with a communication in-progress in the network from the communications switch to a call management processor having access to information associated with the communications service feature, each of the communications switch and the call management processor remotely connected to the network user; and while the communication is in progress, providing management information from the call management processor to the network user based on the information associated with the communication in the network and the information associated with the communications service feature;

wherein the feature control process enables the network user to control a plurality of features associated with the in-progress communication.

18. The method of claim 17, wherein the call management processor also controls the communications service feature through the feature control process and said step of providing includes providing the user with control over the communications service feature through the call management processor.

19. The method of claim 18 wherein the network is a switched telephone network.

20. The method of claim 19, wherein the call management processor has control over the communications service feature through a switch intelligence unit.

21. The method of claim 19 wherein the call management processor is a dedicated Internet server and the user communicates with the dedicated Internet server with a user terminal connected to the dedicated Internet server through the Internet.

22. The method of claim 21 wherein the information about and control over the communications service feature is provided on a home page displayed on the user terminal.

23. The method of claim 19, wherein the information associated with the communication in the network sent from the communications switch includes call detail record data.

24. The method of claim 20, wherein said step of sending information associated with a communication in the network to the call management processor includes information from the switch intelligence unit.

25. The method of claim 19 wherein the user communicates with the call management processor through a user terminal connected to the call management processor by direct dial-up access.

26. The method of claim 20 wherein the switch intelligence unit is a service control point.

27. The method of claim 17, wherein said plurality of features includes muting at least one of the communication participants.

28. The method of claim 17, wherein said plurality of features includes having a private communication with at least one participant.

* * * * *